United States Patent
McQuown et al.

(10) Patent No.: US 10,619,053 B2
(45) Date of Patent: Apr. 14, 2020

(54) SOLAR REFLECTIVE COATING COMPOSITION

(71) Applicant: PRC-DeSoto International, Inc., Sylmar, CA (US)

(72) Inventors: Stephen G. McQuown, Cheswick, PA (US); John Slomski, Lancaster, CA (US); Stuart D. Hellring, Pittsburgh, PA (US); LuAnn Holsing, Saxonburg, PA (US); Tejveen Gill, Acton, CA (US)

(73) Assignee: PRC-DeSoto International, Inc., Sylmar, CA (US)

( * ) Notice: Subject to any disclaimer, the term of this patent is extended or adjusted under 35 U.S.C. 154(b) by 95 days.

(21) Appl. No.: 15/796,101

(22) Filed: Oct. 27, 2017

(65) Prior Publication Data

US 2019/0127592 A1    May 2, 2019

(51) Int. Cl.
| | |
|---|---|
| C09D 5/00 | (2006.01) |
| C08K 5/01 | (2006.01) |
| C09D 7/00 | (2018.01) |
| C09D 5/33 | (2006.01) |
| C08G 18/42 | (2006.01) |
| C09D 7/41 | (2018.01) |
| C08G 18/79 | (2006.01) |
| C09D 175/06 | (2006.01) |
| C09D 7/61 | (2018.01) |
| C09D 7/63 | (2018.01) |
| C09D 167/00 | (2006.01) |
| C08K 5/3437 | (2006.01) |
| C08K 5/3465 | (2006.01) |
| C08K 3/22 | (2006.01) |

(52) U.S. Cl.
CPC ......... *C09D 5/004* (2013.01); *C08G 18/4202* (2013.01); *C08G 18/4277* (2013.01); *C08G 18/79* (2013.01); *C09D 7/41* (2018.01); *C09D 7/61* (2018.01); *C09D 7/63* (2018.01); *C09D 167/00* (2013.01); *C09D 175/06* (2013.01); *C08K 5/01* (2013.01); *C08K 5/3437* (2013.01); *C08K 5/3465* (2013.01); *C08K 2003/2241* (2013.01); *C08K 2201/014* (2013.01); *C08K 2201/019* (2013.01)

(58) Field of Classification Search
CPC .................................. C09D 5/004; C09D 7/41
See application file for complete search history.

(56) References Cited

U.S. PATENT DOCUMENTS

| | | |
|---|---|---|
| 4,157,924 A | 6/1979 | Elms et al. |
| 4,186,036 A | 1/1980 | Elms et al. |
| 5,037,475 A | 8/1991 | Chida et al. |
| 5,989,642 A | 11/1999 | Singer et al. |
| 6,245,855 B1 | 6/2001 | Swarup et al. |
| 6,366,397 B1 | 4/2002 | Genjima et al. |
| 6,387,519 B1 | 5/2002 | Anderson et al. |
| 7,005,472 B2 | 2/2006 | Anderson et al. |
| 8,679,617 B2 | 3/2014 | Eibon et al. |
| 8,822,025 B2 | 9/2014 | Decker et al. |
| 9,056,988 B2 | 6/2015 | Decker et al. |
| 9,057,835 B2 | 6/2015 | Hellring |
| 2004/0191540 A1 | 9/2004 | Jakobi et al. |
| 2009/0098476 A1 | 4/2009 | Denton et al. |
| 2010/0047620 A1 | 2/2010 | Decker et al. |
| 2012/0107584 A1 | 5/2012 | Eibon et al. |
| 2012/0308724 A1 | 12/2012 | Hellring et al. |

FOREIGN PATENT DOCUMENTS

| | | |
|---|---|---|
| WO | 2013037928 | 3/2013 |
| WO | 2018081613 | 5/2018 |

*Primary Examiner* — Ramsey Zacharia
(74) *Attorney, Agent, or Firm* — Michael J. Grese

(57) ABSTRACT

A solar reflective coating composition includes: a film-forming resin; a plurality of near-IR transparent pigments dispersed in the film-forming resin, the plurality of near-IR transparent pigments including a first perylene pigment and a second perylene pigment different from the first perylene pigment; and a near-IR reflective pigment dispersed in the film-forming resin, the near-IR reflective pigment different from the first perylene pigment and the second perylene pigment. When formed into a cured coating over a substrate, the cured coating exhibits an off-white or grey color. The solar reflective coating composition is substantially free of carbon black. The present invention is also directed to a substrate having a surface at least partially coated with a solar reflective coating composition and a method of preparing a low weight aerospace component.

21 Claims, No Drawings

SOLAR REFLECTIVE COATING COMPOSITION

FIELD OF THE INVENTION

The present invention relates to a solar reflective coating composition, a substrate having a surface at least partially coated with the solar reflective coating composition, and a method of preparing a low weight aerospace component.

BACKGROUND OF THE INVENTION

It is desirable for coating compositions applied to aerospace components, such as carbon fiber reinforced polymer composite aircraft wings, to prevent heat build-up of the temperature sensitive aerospace components from absorption of solar radiation. While certain pure white coating compositions may prevent heat build-up of the aerospace component, their pure white color requires a thicker coating layer be applied to the aerospace component in order to fully hide the component surface. The thicker coating layer results in a substantial weight increase of the component, which may be unacceptable in the design of the aircraft. For instance, the heavier component may decrease the fuel efficiency of the overall aircraft.

In addition, aircraft manufactures often aesthetically prefer a non-pure-white coating over the aerospace component. Certain manufacturers prefer an off-white or grey color aerospace component. However, existing off-white or grey coating compositions include carbon black to impart the off-white or grey color, and the carbon black absorbs solar radiation and heats up the temperature sensitive aerospace components to unacceptable levels.

SUMMARY OF THE INVENTION

The present invention is directed to a solar reflective coating composition including: a film-forming resin; a plurality of near-IR transparent pigments dispersed in the film-forming resin, the plurality of near-IR transparent pigments including a first perylene pigment and a second perylene pigment different from the first perylene pigment; and a near-IR reflective pigment dispersed in the film-forming resin, the near-IR reflective pigment different from the first perylene pigment and the second perylene pigment. When formed into a cured coating over a substrate, the cured coating exhibits an off-white or grey color. The solar reflective coating composition is substantially free of carbon black.

The present invention is also directed to a substrate having a surface at least partially coated with a solar reflective coating composition. The solar reflective coating composition includes: a film-forming resin; a plurality of near-IR transparent pigments dispersed in the film-forming resin, the plurality of near-IR transparent pigments including a first perylene pigment and a second perylene pigment different from the first perylene pigment; and a near-IR reflective pigment dispersed in the film-forming resin, the near-IR reflective pigment different from the first perylene pigment and the second perylene pigment. When formed into a cured coating over a substrate, the cured coating exhibits an off-white or grey color. The solar reflective coating composition is substantially free of carbon black.

The present invention is also directed to a method of preparing a low weight aerospace component including: coating at least a portion of surface of an aerospace component with a solar reflective coating composition; and curing the solar reflective coating composition to form a solar reflective layer. The solar reflective coating composition includes: a film-forming resin; a plurality of near-IR transparent pigments dispersed in the film-forming resin, the plurality of near-IR transparent pigments including a first perylene pigment and a second perylene pigment different from the first perylene pigment; and a near-IR reflective pigment dispersed in the film-forming resin, the near-IR reflective pigment different from the first perylene pigment and the second perylene pigment. When formed into a cured coating over a substrate, the cured coating exhibits an off-white or grey color. The solar reflective coating composition is substantially free of carbon black.

The present invention is also directed to a vehicle including a surface at least partially coated with a solar reflective coating composition. The solar reflective coating composition includes: a film-forming resin; a plurality of near-IR transparent pigments dispersed in the film-forming resin, the plurality of near-IR transparent pigments including a first perylene pigment and a second perylene pigment different from the first perylene pigment; and a near-IR reflective pigment dispersed in the film-forming resin, the near-IR reflective pigment different from the first perylene pigment and the second perylene pigment. When formed into a cured coating over a substrate, the cured coating exhibits an off-white or grey color. The solar reflective coating composition is substantially free of carbon black.

DESCRIPTION OF THE INVENTION

For purposes of the following detailed description, it is to be understood that the invention may assume various alternative variations and step sequences, except where expressly specified to the contrary. Moreover, other than in any operating examples or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an"

means "at least one" unless specifically stated otherwise. For example, "an" aerospace component, "a" pigment, and the like refer to one or more of these items. Also, as used herein, the term "polymer" may refer to prepolymers, oligomers, and both homopolymers and copolymers. The term "resin" is used interchangeably with "polymer."

As used herein, the transitional term "comprising" (and other comparable terms, e.g., "containing" and "including") is "open-ended" and is used in reference to compositions, methods, and respective component(s) thereof that are essential to the invention, yet open to the inclusion of unspecified matter.

CIELAB $L^*$, $a^*$, $b^*$, $C^*$, $h°$, and $\Delta E$ values reported herein were all determined using an integrating sphere with D65 Illumination, 10° observer with specular component included according to ASTM 308 unless indicated otherwise. In the CIELAB color system, $L^*$ represents lightness/darkness on a scale of 0=pure black to 100=diffuse white, $a^*$ represents the balance of green $-a^*$ to red $+a^*$, $b^*$ represents the balance of blue $-b^*$ to yellow $+b^*$, $C^*$ represents chroma, and $h°$ represents hue angle. The $\Delta E^*$ value represents the three dimensional color model difference between two colors.

The present invention is directed to a solar reflective coating composition including (a) a film-forming resin, (b) a plurality of near-infrared (near-IR) transparent pigments dispersed in the film-forming resin, and (c) a near-IR reflective pigment dispersed in the film-forming resin. The plurality of near-IR transparent pigments include a first perylene pigment and a second perylene pigment different from the first perylene pigment. The near-IR reflective pigment is different from the first perylene pigment and the second perylene pigment. When the solar reflective coating composition is cured over a substrate to form a coating, the cured coating exhibits an off-white or grey color. The solar reflective coating composition is substantially free of carbon black.

As used in this application, the term "substantially free", when used with reference to the amount of carbon black in a coating composition, means that carbon black is present in the composition in an amount of no more than 0.02% by weight, such as no more than 0.01%, based on the total solids weight of the composition. As used herein, the term "completely free", when used with reference to the amount of carbon black in a coating composition, means that carbon black is not present in the composition at all.

The film-forming resin may include a thermosetting film-forming resin. As used herein, the term "thermosetting" refers to resins that "set" irreversibly upon curing or cross-linking, where the polymer chains of the polymeric components are joined together by covalent bonds. This property is usually associated with a cross-linking reaction of the composition constituents often induced, for example, by heat or radiation. Curing or crosslinking reactions may also be carried out under ambient conditions. Curing conditions can also be non-ambient conditions. Once cured or crosslinked, a thermosetting resin will not melt upon the application of heat and is insoluble in solvents. In other examples, the film-forming resin included within the coatings described herein may include a thermoplastic resin. As used herein, the term "thermoplastic" refers to resins that include polymeric components that are not joined by covalent bonds and thereby can undergo liquid flow upon heating and are soluble in solvents.

The film-forming resin may include any of a variety of thermoplastic and/or thermosetting compositions known in the art. The solar reflective coating composition may be deposited from water-based or solvent-based liquid compositions, or, alternatively, a composition in solid particulate form (e.g., a powder coating).

Thermosetting coating compositions may include a cross-linking agent that may be selected from, for example, aminoplasts, polyisocyanates including blocked isocyanates, polyepoxides, beta-hydroxyalkylamides, polyacids, anhydrides, organometallic acid-functional materials, polyamines, polyamides, and mixtures of any of the foregoing. Thermosetting or curable coating compositions typically include film forming resins having functional groups that are reactive with the crosslinking agent.

The film-forming resin of the solar reflective coating composition may be selected from any of a variety of polymers well-known in the art. The film-forming resin may be selected from, for example, acrylic polymers, polyester polymers, polyurethane polymers, polyurea polymers, polyamide polymers, polyether polymers, polysiloxane polymers, copolymers thereof, and mixtures thereof. Generally, these polymers may be any polymers of these types made by any method known to those skilled in the art. Functional groups on the film-forming resin may be selected from any of a variety of reactive functional groups including, for example, carboxylic acid groups, amine groups, epoxide groups, hydroxyl groups, thiol groups, carbamate groups, amide groups, urea groups, isocyanate groups (including blocked isocyanate groups), mercaptan groups, alkoxy-silane functional groups, and combinations thereof. In some examples, the film-forming resin is a polyurethane; however, the film-forming resin may be any resin system that does not contain a component that would absorb solar radiation to a degree that would interfere with the reflective features of the present invention.

Appropriate mixtures of film-forming resins may also be used in the preparation of the solar reflective coating compositions described herein.

The solar reflective coating composition may include a plurality of near-IR transparent pigments. As used herein, the term "near-IR transparent pigment" may refer to a pigment that is substantially transparent in the near-IR range (700 to 2500 nm), such as is described in United States Patent Application Publication No. 2004/0191540 at [0020]-[0026], the cited portion of which is incorporated herein by reference, without appreciable scattering or absorption of radiation in such wavelengths. In certain examples, the near-IR transparent pigment may have an average transmission of at least 70% in the near-IR wavelength region. The near-IR transparent pigment may be visibly-absorbing. As used herein, the term "visibly-absorbing" may refer to a pigment that substantially absorbs radiation in at least some wavelengths within the visible region of 400 nm to 700 nm.

The solar reflective coating composition includes a plurality of near-IR transparent pigments, and the plurality of near-IR transparent pigments includes a plurality of perylene pigments, including at least a first perylene pigment and a second perylene pigment. Perylene pigments may refer to pigments that rely in part upon a perylene type structure illustrated below:

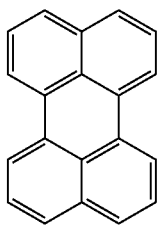 [SMILES: c1cc2cccc3c4cccc5cccc(c(c1)c23)c54]

Commercially available examples of such pigments include PALIOGEN® pigments available from BASF Corporation (Ludwigshafen, Germany), such as PALIOGEN® Black EH 0788 pigment; PALIOGEN® Black L0086; as well as PALIOGEN® Black S0084. Further examples of infrared transparent black pigments that are suitable for use in certain embodiments of the present invention are described in United States Patent Application Publication No. 2009/0098476 at [0030] to [0034], the cited portion of which is incorporated by reference herein.

In some embodiments, the coating composition may include at least one perylene pigment according to formula (a) or (b):

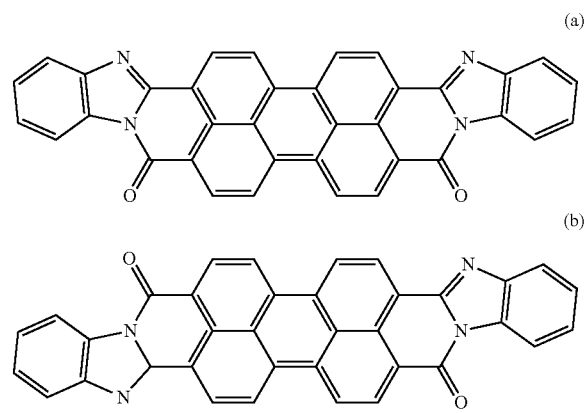

Such pigments are commercially available as PALIOGEN® Black EH 0788.

In certain embodiments, the coating composition may include a perylene pigment according to formula (c):

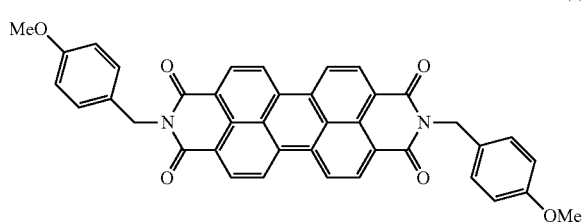

Such perylene pigment is also known as "CI Pigment Black 32" and is commercially available as PALIOGEN® Black L 0086.

As previously discussed, the plurality of perylene pigments may include a first perylene pigment and a second perylene pigment. The first perylene pigment may be a green-shade perylene pigment. The green-shade perylene pigment, when utilized alone at a high enough concentration and applied at a suitable dry film thickness, may appear black to the human eye. However, when the green-shade perylene pigment is utilized in combination with a near-IR reflective pigment (such as titanium dioxide) in a coating composition (e.g., the same layer of a multilayer coating composition), the coating composition may appear to be a green-shade to the human eye. Green-shade means exhibiting CIELAB values using an integrating sphere with D65 Illumination, 10° observer with specular component included of: L* of 40-95 and h° of 275-325.

Further, the second perylene pigment may be a purple-shade perylene pigment. The purple-shade perylene pigment, when utilized alone at a high enough concentration and applied at a suitable dry film thickness, may appear black to the human eye. However, when the purple-shade perylene pigment is utilized in combination with near-IR reflective pigment (such as titanium dioxide) in a coating composition (e.g., the same layer of a multilayer coating composition), the coating composition may appear to be a purple-shade to the human eye. Purple-shade means exhibiting CIELAB values using an integrating sphere with D65 Illumination, 10° observer with specular component included of: L* of 40-95 and h° of 170-200.

The combination of the green-shade perylene pigment and purple shade perylene pigment with titanium dioxide in a coating composition (e.g., the same layer of a multilayer coating composition) may result in the cured coating composition exhibiting an off-white or grey color. Off-white or grey may mean exhibiting the following CIELAB values as measured using an integrating sphere with D65 Illumination, 10° observer with specular component included: a L* value ranging from 40 to 95; an a* value ranging from −2 to 2; and a b* value ranging from −6 to 6. In some examples, the L* value may be at least 70, such as at least 75, at least 80, or at least 85. The off-white or grey color coating compositions have a different color from the previously discussed "pure white" coating compositions, which have the following CIELAB values as measured using an integrating sphere with D65 Illumination, 10° observer with specular component included: L* greater than 95 and an a* and a b* value close to 0, such as −1 to 1 or −2 to 2.

While the combination of green-shade and purple-shade perylene pigments with the near-IR reflective pigment (such as titanium dioxide) may form an off-white or grey color cured coating, it will be appreciated that other combinations of perylene pigments may be combined with the near-IR reflective pigment (such as titanium dioxide) to form the off-white or grey cured coating. Thus, other combinations of perylene pigments may be utilized to achieve an off-white or grey cured coating.

Other additional near-IR transparent pigments may also be included in the coating composition with the plurality of perylene pigments. Non-limiting examples of suitable additional visibly-absorbing near-IR transparent pigments may include, for example, copper phthalocyanine pigment, halogenated copper phthalocyanine pigment, anthraquinone pigment, quinacridone pigment, monoazo pigment, disazo pigment, quinophthalone pigment, indanthrone pigment, dioxazine pigment, isoindoline pigment, diarylide yellow pigment, brominated anthranthrone pigment, azo metal complex pigments, and the like. Combinations of these near-IR transparent pigments may be used.

The solar reflective coating composition may also include, or may include in lieu of additional near-IR transparent pigments, at least one near-IR transparent dye. As used herein, the term "near-IR transparent dye" may refer to a dye that is substantially transparent in the near-IR range (700 nm to 2500 nm) without appreciable scattering or absorption of radiation in such wavelengths. In certain examples, the near-IR transparent pigment may have an average transmission of at least 70% in the near-IR wavelength region. As used herein, the term "visibly-absorbing" refers to a pigment that substantially absorbs radiation in at least some wavelengths within the visible region of 400 nm to 700 nm.

The solar reflective coating composition includes at least one near-IR reflective pigment. The near-IR reflective pigment is included in the same solar reflective coating composition as the plurality of near-IR transparent pigments (including the plurality of perylene pigments). In other words, a single coating layer includes a plurality of near-IR transparent pigments (including the plurality of perylene pigments) and at least one near-IR reflective pigment.

As used herein, the terms "near-IR reflective pigment" may refer to a pigment that, when included in a coating composition, provides a cured coating with a reflectance of near-IR radiation greater than a cured coating deposited in the same manner from the same composition but without the near-IR reflective pigment.

One example of a near-IR reflective pigment may be titanium dioxide. The titanium dioxide may be provided in the coating composition without first being adhered to thin flakes (as described below) such as the titanium dioxide being in powder form, which itself is dispersed in the film-forming resin. Standard grades of titanium dioxide powder may be used, or select particle size distributions of titanium dioxide powder optimized to provide scattering in the visible range and/or the near-IR range may be used as the near-IR reflective pigment.

Other suitable near-IR reflective pigments may include thin flakes of metal or metal alloy near-IR reflective pigments, which may include, for example, aluminum, chromium, cobalt, iron, copper, manganese, nickel, silver, gold, iron, tin, zinc, bronze, brass, including alloys thereof, such as zinc-copper alloys, zinc-tin alloys, and zinc-aluminum alloys, among others. Some specific examples include nickel antimony titanium, nickel niobium titanium, chrome antimony titanium, chrome niobium, chrome tungsten titanium, chrome iron nickel, chromium iron oxide, chromium oxide, chrome titanate, manganese antimony titanium, manganese ferrite, chromium green-black, cobalt titanates, chromites, or phosphates, cobalt magnesium, and aluminites, iron oxide, iron cobalt ferrite, iron titanium, zinc ferrite, zinc iron chromite, and copper chromite, as well as combinations thereof.

Such pigments may be in the form of thin flakes. For example, "leafing" aluminum flakes are often suitable. As used herein, the term "thin flake" means that a particle has a ratio of its width to its thickness (termed "aspect ratio") that is at least 2 and often falls in the range of 10 to 2,000, such as 3 to 400, or, in some cases, 10 to 200, including 10 to 150. As such, a "thin flake" particle is one that has a substantially flat structure. Such flakes may have a coating deposited thereon, such as is the case with silica coated copper flakes.

Such thin flake particles may have a thickness of less than 0.05 microns to 10 microns, such as 0.5 microns to 5 microns. In certain examples, such thin flake particles have a maximum width of 10 microns to 150 microns, such as 10 microns to 30 microns.

The thin flake particles may have rounded edges and a smooth and flat surface, as opposed to jagged edges. Flakes having angular edges and uneven surfaces are known in the art as "cornflakes". On the other hand, flakes distinguished by more rounded edges, smoother, flatter surfaces are referred to as "silver dollar" flakes. Moreover, in certain examples, the thin flake metal or metal alloy particles having rounded edges may have a maximum width of no more than 25 microns, such as 10 microns to 15 microns, when measured according to ISO 1524.

Additional suitable thin flake metal or metal alloy near-IR reflective pigments may include colored metallic pigments, such as those in which a coloring pigment is chemically adsorbed on the surface of a metallic pigment. Such colored metallic pigments are described in U.S. Pat. No. 5,037,745 at col. 2, l. 55 to col. 7, l. 54, the cited portion of which being incorporated herein by reference. Some such colored metallic pigments are also commercially available and include those available from U.S. Aluminum, Inc. (Flemington, N.J.) under the tradename FIREFLAKE®. Near-IR transparent pigments, such as the perylene-based pigments described below, may be chemically adsorbed on the surface of the metallic pigment, to provide a dark, sometimes black, colored near-IR reflective metallic pigment.

The solar reflective coating composition may include additional near-IR reflective pigments. Such additional near-IR reflective pigment may be colored or essentially colorless, translucent, or opaque. As used herein, the term "essentially colorless" means that the pigment does not have a color, e.g., the absorption curve for the pigment is devoid of absorption peaks in the 400 nm to 700 nm range and does not present a tint or hue in reflected or transmitted light when viewed under sunlight. A colored near-IR reflective pigment may be a near-IR reflective pigment that is not essentially colorless. Stated differently, a "colored" near-IR reflective pigment is one that may be visibly-absorbing. A "translucent" pigment means that visible light is able to pass through the pigment diffusely. An "opaque" pigment is one that scatters significant amounts of light. One example of a near-IR reflective pigment that can be translucent and essentially colorless (if used in small enough amounts in a coating) is SOLARFLAIR® 9870 pigment, commercially available from Merck KGaA (Darmstadt, Germany). This commercially available pigment may also be an example of an interference pigment (described below) that has a mica substrate that is coated with titanium dioxide.

Examples of suitable colored and/or opaque near-IR reflective pigments include, for example, any of a variety of metals and metal alloys, inorganic oxides, and interference pigments. Exemplary colors include, for example: white, as is the case with titanium dioxide; brown, as is the case with iron titanium brown spinel; green, as is the case with chromium oxide green; red, as is the case with iron oxide red; yellow, as is the case with chrome titanate yellow and nickel titanate yellow; and blue and violet, as is the case with certain titanium dioxide coated mica flakes.

Suitable inorganic oxide containing near-IR reflective pigments include, for example, iron oxide, titanium oxide pigment, composite oxide system pigments, titanium oxide-coated mica pigment, iron oxide-coated mica pigment, and zinc oxide pigment, among many others. The suitable colored and/or opaque near-IR reflective pigments in some examples may not be applied to thin flakes.

As used in this application, the term "interference pigment" refers to a pigment having a multi-layer structure having alternating layers of material of different refractive index. Suitable light-interference pigments include pigments comprising a substrate of, for example, mica, $SiO_2$, $Al_2O_3$, $TiO_2$, or glass that is coated with one or more layers of e.g., titanium dioxide, iron oxide, titanium iron oxide or chrome oxide or combinations thereof, or pigments comprising combinations of metal and metal oxide, such as aluminum coated with layers of iron oxide layers and/or silicon dioxide.

The solar reflective coating composition may include other optional materials well known in the art of formulated surface coatings, such as plasticizers, anti-oxidants, hindered amine light stabilizers, UV light absorbers and stabilizers, surfactants, flow control agents, thixotropic agents such as bentonite clay, pigments, fillers, organic co-solvents, and catalysts, including phosphonic acids, and other customary auxiliaries.

The substrate over which the solar reflective coating compositions may be deposited may take numerous forms and be produced from a variety of materials. In certain embodiments, the substrate takes the form of: (i) an automobile component, such as an interior or exterior metal panel, leather or fabric seating areas, plastic components, such as dashboards or steering wheels, and/or other interior vehicle surfaces; (ii) an aerospace component, such as an aircraft exterior panel (e.g., an aircraft wing) (which may be metal, such as aluminum, an aluminum alloy, or other mixed metals, or produced from a polymeric composite material (e.g., carbon fiber reinforced polymer composite), for example), leather, plastic or fabric seating areas and interior panels, including control panels and the like; (iii) a building component, such as exterior panels and roofing materials; and (iv) industrial components, among others.

Suitable substrate materials include, for example, cellulosic-containing materials, including paper, paperboard, cardboard, plywood and pressed fiber boards, hardwood, softwood, wood veneer, particleboard, chipboard, oriented strand board, and fiberboard. Such materials may be made entirely of wood, such as pine, oak, maple, mahogany, cherry, and the like. In some cases, however, the materials may comprise wood in combination with another material, such as a resinous material, i.e., wood/resin composites, such as phenolic composites, composites of wood fibers and thermoplastic polymers, and wood composites reinforced with cement, fibers, or plastic cladding.

Suitable metallic substrate materials include, but are not limited to, foils, sheets, or workpieces constructed of cold rolled steel, stainless steel and steel surface-treated with any of zinc metal, zinc compounds and zinc alloys (including electrogalvanized steel, hot-dipped galvanized steel, galvanneal steel, and steel plated with zinc alloy), copper, magnesium, and alloys thereof, aluminum alloys, zinc-aluminum alloys such as GALFAN®, GALVALUME®, aluminum plated steel, and aluminum alloy plated steel substrates may also be used. Steel substrates (such as cold rolled steel or any of the steel substrates listed above) coated with a weldable, zinc-rich or iron phosphide-rich organic coating are also suitable. Such weldable coating compositions are disclosed in, for example, U.S. Pat. Nos. 4,157,924 and 4,186,036. Cold rolled steel is also suitable when pretreated with, for example, a solution selected from the group consisting of a metal phosphate solution, an aqueous solution containing at least one Group IIIB or IVB metal, an organophosphate solution, an organophosphonate solution, and combinations thereof. Also, suitable metallic substrates include silver, gold, and alloys thereof.

Non-limiting examples of suitable silicatic substrates are glass, porcelain and ceramics.

Non-limiting examples of suitable polymeric substrates are polystyrene, polyamides, polyesters, polyethylene, polypropylene, melamine resins, polyacrylates, polyacrylonitrile, polyurethanes, polycarbonates, polyvinyl chloride, polyvinyl alcohols, polyvinyl acetates, polyvinylpyrrolidones and corresponding copolymers and block copolymers, biodegradable polymers, and natural polymers, such as gelatin.

Non-limiting examples of suitable textile substrates are fibers, yarns, threads, knits, wovens, nonwovens and garments composed of polyester, modified polyester, polyester blend fabrics, nylon, cotton, cotton blend fabrics, jute, flax, hemp and ramie, viscose, wool, silk, polyamide, polyamide blend fabrics, polyacrylonitrile, triacetate, acetate, polycarbonate, polypropylene, polyvinyl chloride, polyester microfibers, and glass fiber fabric.

Non-limiting examples of suitable leather substrates are grain leather (e.g., nappa from sheep, goat or cow and box-leather from calf or cow), suede leather (e.g., velours from sheep, goat, or calf and hunting leather), split velours (e.g., from cow or calf skin), buckskin and nubuk leather; further, also woolen skins and furs (e.g., fur-bearing suede leather). The leather may have been tanned by any conventional tanning method, in particular vegetable, mineral, and synthetic or combined tanned (e.g., chrome tanned, zirconyl tanned, aluminum tanned, or semi-chrome tanned). If desired, the leather may also be re-tanned; for re-tanning there may be used any tanning agent conventionally employed for re-tanning, e.g., mineral, vegetable, or synthetic tanning agents, e.g., chromium, zirconyl or aluminum derivatives, quebracho, chestnut or mimosa extracts, aromatic syntans, polyurethanes, (co) polymers of (meth) acrylic acid compounds or melamine, dicyanodiamide and/or urea/formaldehyde resins.

Non-limiting examples of suitable compressible substrates include foam substrates, polymeric bladders filled with liquid, polymeric bladders filled with air and/or gas, and/or polymeric bladders filled with plasma. As used herein, the term "foam substrate" means a polymeric or natural material that comprises a open cell foam and/or closed cell foam. As used herein, the term "open cell foam" means that the foam comprises a plurality of interconnected air chambers. As used herein, the term "closed cell foam" means that the foam comprises a series of discrete closed pores. Example foam substrates include, but are not limited to, polystyrene foams, polymethacrylimide foams, polyvinylchloride foams, polyurethane foams, polypropylene foams, polyethylene foams, and polyolefinic foams. Example polyolefinic foams include, for example, polypropylene foams, polyethylene foams and/or ethylene vinyl acetate (EVA) foam. EVA foam can include flat sheets or slabs or molded EVA forms, such as shoe midsoles. Different types of EVA foam can have different types of surface porosity. Molded EVA can comprise a dense surface or "skin", whereas flat sheets or slabs can exhibit a porous surface.

The solar reflective coating composition may be applied over at least a portion of a surface of a vehicle. In the present disclosure, the term "vehicle" is used in its broadest sense and includes all types of aircraft, spacecraft, watercraft, and ground vehicles. For example, the vehicle can include, but is not limited to aircraft such as, for example, airplanes (e.g., private airplanes, and small, medium, or large commercial passenger, freight, and military airplanes), helicopters (e.g., private, commercial, and military helicopters), aerospace vehicles (e.g., rockets and other spacecraft), and the like. The vehicle can also include a ground vehicle such as, for example, animal trailers (e.g., horse trailers), cars, trucks, buses, vans, heavy duty equipment, golf carts, motorcycles, bicycles, trains, railroad cars and the like. The vehicle can also include watercraft such as, for example, ships, boats, hovercraft, and the like. In some embodiments, the solar reflective coating composition may be applied over a surface of a F/A-18 jet (or derivations or variants thereof, such as, for example, the F/A-18E Super Hornet and F/A-18F; produced by McDonnell Douglas/Boeing and Northrop) and/or the Boeing 787 Dreamliner, 737, 747, and/or 717 passenger jet aircraft (or derivations or variants thereof; produced by Boeing Commercial Airplanes); V-22 Osprey; VH-92 and S-92 (or derivations or variants thereof; produced by NAVAIR and Sikorsky); the G650, G600, G550, G500 and G450 (or derivations or variants thereof; produced by Gulfstream); and the A350, A320, and/or A330 (or derivations or variants thereof; produced by Airbus). The solar reflective coating composition may be applied over a surface of a military, or general aviation aircraft such as, for example, those produced by Bombardier Inc. and/or Bombardier Aerospace (e.g., the Canadair Regional Jet (CRJ) and derivatives thereof), Lockheed Martin (e.g., the F-22 Raptor, the F-35 Lightning, and derivatives thereof), Northrop Grumman (e.g., the B-2 Spirit and derivatives thereof), Pilatus Aircraft Ltd., and Eclipse Aviation Corporation or Eclipse Aerospace (now Kestrel Aircraft).

The coating compositions from which each of the coatings described above is deposited may be applied to a substrate by any of a variety of methods including dipping or immersion, spraying, intermittent spraying, dipping followed by spraying, and/or spraying followed by dipping, brushing, or roll-coating, among other methods. In certain embodiments, however, the coating compositions are applied by spraying and, accordingly, such compositions often have a viscosity that is suitable for application by spraying at ambient conditions.

After application of the solar reflective coating composition over the substrate, it is allowed to coalesce to form a substantially continuous film on the substrate. The dry film thickness may be from 0.01 mils to 20 mils (0.254 microns to 508 microns), such as 0.1 mils to 5 mils (2.54 microns to 127 microns), 0.2 mils to 10 mils (5.08 microns to 254 microns), 0.5 mils to 2.5 mils (12.7 microns to 63.5 microns), or any other subrange therein. This amount may be sufficient to fully hide the surface of the substrate or the underlying layer over which the solar reflective coating composition is applied according to ASTM D6762 using Lenata black and white hiding strips. The solar reflective coating composition may fully hide the substrate or underlying layer at a dry film thickness of less than or equal to 2.5 mils (63.5 microns), such as less than or equal to 2.0 mils (50.8 microns), less than or equal to 1.5 mils (38.1 microns), or less than or equal to 1.0 mils (25.4 microns).

The solar reflective coating composition, when cured over the substrate or underlayer to form a coating, may exhibit a percent total solar reflectance (% TSR) of at least 45%, such as at least 50%, at least 55%, at least 60%, at least 65%, at least 70%, at least 75%, at least 80%, or at least 85%, as measured in accordance with ASTM E903-12.

In some examples, the solar reflective coating composition is the sole coating layer over the substrate, such as the sole coating layer over an aerospace component. In an example in which the solar reflective coating layer is the sole coating layer, other treatments may also be applied to the substrate over or under the solar reflective coating composition. A film surfacer, such as a SURFACE MASTER® product from Cytec Solvay Group (Woodland Park, N.J.) may be applied, such as applied onto fiber reinforced polymer composite substrates. Various pretreatments may be applied over metal substrates, such as aluminum substrates. For example, the pretreatment may be a cleaning treatment, a deoxidation treatment, and/or a conversion treatment (e.g. ALODINE® from Henkel Corporation (Dusseldorf, Germany)). An adhesion promoter may be applied as a treatment. It will be appreciated that these treatments applied over the substrate along with the sole solar reflective coating layer are not additional coating layers and do not form a continuous film over the substrate.

In other examples, the solar reflective coating layer is a single layer in a multilayer system. The solar reflective coating layer may be applied over at least a portion of a basecoat layer (the basecoat layer underlying the solar reflective layer). Examples of basecoat layers include DESOPRIME® CA7502A (an epoxy amine) or DESOTHANE® HS CA8000 B7067 (a polyurethane). The solar reflective coating may be applied over at least a portion of a primer layer. A topcoat and/or clearcoat layer may be applied over the solar reflective coating layer. The multilayer system may also include a sanding-surfacer layer. The multilayer system may also include a selectively strippable layer. It will be appreciated that any combination of these various layers may be used in combination with the solar reflective coating. The other layers may also be substantially free of carbon black or completely free of carbon black, as previously defined. In some examples, the solar reflective layer and the basecoat layer may be the only coating layers over the substrate (e.g., there are not further coating layers). The solar reflective coating layer may be the outermost layer applied over the substrate, such that it is the coating layer directly exposed to the solar radiation.

In other examples, a clearcoat layer may be applied over the solar reflective coating layer. The clearcoat layer may be substantially clear. As used herein, "substantially clear" refers to a coating that is substantially transparent and not opaque. The clearcoat may include a colorant but, in such cases, the colorant is not present in an amount sufficient to render the coating opaque. Clearcoats described in, for example, U.S. Pat. Nos. 5,989,642, 6,245,855, 6,387,519, and 7,005,472, may be used in the coating systems of the present invention, and their disclosures are herein incorporated by reference. In certain examples, the clearcoat may include particles, such as silica particles, that are dispersed in the clearcoat (such as at the surface of the clearcoat).

A low weight aerospace component, such as an aircraft wing, may be prepared using the solar reflective coating composition. At least a portion of the surface of the aerospace component may be coated with the solar reflective coating composition as previously described. The solar reflective coating composition may be cured to form a solar reflective layer over the aerospace component. The solar reflective layer may have a dry film thickness of less than or equal to 2.5 mils (63.5 microns), such as less than or equal to 2.0 mils (50.8 microns), less than or equal to 1.5 mils (38.1 microns), or less than or equal to 1.0 mils (25.4 microns). This solar reflective layer may fully hide the aerospace component.

EXAMPLES

The following examples are presented to demonstrate the general principles of the invention. The invention should not be considered as limited to the specific examples presented.

Example 1

Coating compositions were prepared including the components listed in Table 1. For each coating composition, the component or components listed as 1a-1k were premixed to form the pigmented base coating component. Components 2 and 3, the activator and thinner, were then added and the coating composition mixed to uniformity just prior to application.

and Comp. Grey 1 were spray applied thereover by hand using a Binks Mach 3 HVLP type spray gun and a 95AS spray cap to a dry film thickness that provided full hiding. Percent Total Solar Reflectance (% TSR) was measured

TABLE 1

| | Component | Grey 1 | Grey 2 | Grey 3 | Grey 4 | Grey 5 | Comp. Pure White 1 | Comp. Pure White 2 | Comp. Grey 1 | Comp. Purple 1 | Comp. Green 1 |
|---|---|---|---|---|---|---|---|---|---|---|---|
| 1a | Untinted White Base[1] | 58.62 | 58.34 | — | — | 49.81 | — | — | — | 48.59 | 48.4 |
| 1b | IR Transparent Black Base[2] | 0.5 | 0.78 | — | — | 9.38 | — | — | — | — | — |
| 1c | Yellow Tint Base[3] | 0.04 | 0.04 | — | — | — | — | — | — | — | — |
| 1d | Red Tint Base[4] | 0.01 | 0.01 | — | — | — | — | — | — | — | — |
| 1e | Tinted Grey Base[5] | — | — | 59.17 | — | — | — | — | — | — | — |
| 1f | Tinted Grey Base[6] | — | — | — | 59.19 | — | — | — | — | — | — |
| 1g | Tinted White Base[7] | — | — | — | — | — | 59.17 | — | — | — | — |
| 1h | Tinted White Base (With Carbon Black)[8] | — | — | — | — | — | — | 59.19 | — | — | — |
| 1i | Tinted Grey Base (With Carbon Black)[9] | — | — | — | — | — | — | — | 59.19 | — | — |
| 1j | IR Transparent Black Tint (Purple)[10] | — | — | — | — | — | — | — | — | 9.15 | — |
| 1k | IR Transparent Black Tint (Green)[11] | — | — | — | — | — | — | — | — | — | 9.11 |
| 2 | Activator[12] | 22.98 | 22.98 | 22.98 | 22.97 | 22.97 | 22.98 | 22.97 | 22.97 | 23.79 | 23.92 |
| 3 | Thinner[13] | 17.85 | 17.85 | 17.85 | 17.84 | 17.84 | 17.85 | 17.84 | 17.84 | 18.47 | 18.57 |

[1]Pigmented polyol base component commercially available from PPG Aerospace PRC-DeSoto as DESOTHANE® HS CA8000/BAC7067 (Sylmar, CA).
[2]Pigmented polyol base component commercially available from PPG Aerospace PRC-DeSoto as DESOTHANE® HS CA8000/SR8000 (Sylmar, CA). Includes a mixture of Components 1j and 1k.
[3]Pigmented polyol base component at approximately 76% solids in solvent and a P:B = 1.39 with binder consisting of a blend of approximately 68% polyester polyol (100% active, hydroxyl number = 230) and 32% polycaprolactone (100% active, hydroxyl value = 218), pigments consisting of approximately 44% yellow iron oxide (PY42) and 56% barium sulfate and a mixture of additives such as dispersants, UV protection package, anti-settling modifiers and other common additives known to those familiar with the art (Sylmar, CA).
[4]Pigmented tint base component at approximately 73% solids in solvent and a P:B = 1.03 with binder consisting of a blend of approximately 68% polyester polyol (100% active, hydroxyl number = 230) and 32% polycaprolactone (100% active, hydroxyl value = 218), pigments consisting of approximately 24% quinacridone red (PV19) and 76% barium sulfate and a mixture of additives such as dispersants, UV protection package, anti-settling modifiers and other common additives known to those familiar with the art (Sylmar, CA).
[5]Pigmented polyol base component commercially available from PPG Aerospace PRC-DeSoto as DESOTHANE® HS CA8000/SR1343 (Sylmar, CA). Component 1e included a mixture of Components 1a and 1b, and was substantially free of carbon black.
[6]Pigmented polyol base component commercially available from PPG Aerospace PRC-DeSoto as DESOTHANE® HS CA8000/BAC2001 (Sylmar, CA). Component 1f included a mixture of Components 1a and 1b, and was substantially free of carbon black.
[7]Pigmented polyol base component commercially available from PPG Aerospace PRC-DeSoto as DESOTHANE® HS CA8000/SR1408 (Sylmar, CA). Component 1h was substantially free of carbon black.
[8]Pigmented polyol base component commercially available from PPG Aerospace PRC-DeSoto as DESOTHANE® HS CA8000/BAC70846 (Sylmar, CA). Component 1h included carbon black.
[9]Pigmented polyol base component commercially available from PPG Aerospace PRC-DeSoto as DESOTHANE® HS CA8000/BAC707 (Sylmar, CA). Component 1i included carbon black.
[10]Pigmented dispersion component prepared in a manner consistent with U.S. Pat. No. 9,057,835 B2 Example 2. Component 1j included titanium dioxide, but was substantially free of carbon black.
[11]Pigmented dispersion component prepared in a manner consistent with U.S. Pat. No. 9,057,835 B2 Example 6. Component 1j included titanium dioxide, but was substantially free of carbon black.
[12]Isocyanate oligomer based hardener component commercially available from PPG Aerospace PRC-DeSoto as DESOTHANE® HS CA8000B Activator (Sylmar, CA).
[13]Solvent based thinner component commercially available from PPG Aerospace PRC-DeSoto as CA8000C (Sylmar, CA).

Example 2

Coating compositions prepared in Example 1 (the grey primer made using a combination of infrared transparent black pigments (Grey 3) and the grey primer made using carbon black (Comp. Grey 1)) were tested.

The samples from Table 2 were prepared as follows: 1 mil of a carbon black paint (commercially available from PPG Aerospace PRC-DeSoto as DESOTHANE® HS CA8000/BAC701 (Sylmar, Calif.)) was applied to 3"×6" panels of 2024 T3 aluminum to mimic the near-IR absorption of a carbon fiber composite substrate. On top of this was applied 0.8 mils of a chrome free primer (commercially available as DESOPRIME® CF/CA7502A from PPG Aerospace PRC-De-Soto (Sylmar, Calif.)). The coating compositions Grey 3 using a LAMBDA 950 S ultraviolet/visible/near-IR spectrophotometer (PerkinElmer®) following ASTM E903-12.

The maximum temperature reached under a heat lamp was also measured. This was carried out using a testing apparatus defined in ASTM B4803-10 consisting of an insulated wooden box, IR lamp and a digital thermometer using a Type J thermocouple. The two panels were placed side-by-side, but not in contact, 15.5 inches directly under the IR lamp and monitored for temperature until both panels reached a maximum temperature, which did not increase any further.

The results are provided in Table 2. The sample coated with Comp. Grey 1 reflected 43% of the total solar radiation, whereas the sample coated with Grey 3 reflected 72%, for a relative increase in performance of 44%. The samples coated with Grey 3 had a maximum temperature that was 19.1° F. (10.6° C.) less than the sample coated with Comp. Grey 1.

TABLE 2

|  | Grey 3 | Comp. Grey 1 |
|---|---|---|
| % Total Solar Reflectance | 72 | 43 |
| Difference in % TSR | 29 | — |
| % Improvement in % TSR | 40 | — |
| Maximum Temperature Measured Under Heat Lamp ° F. (° C.) | 153.9 (67.7) | 173.0 (78.3) |
| Difference in Temperature ° F. (° C.) | 19.1 (10.6) | — |
| % Improvement in Maximum Temperature | 11 | — |

Example 3

Several of the coating compositions prepared in Example 1 were applied to full hiding over a byko-chart Brushout 5DX Card (Byk-Gardner catalog No. 2856). The samples were then characterized for CIELAB color using an integrated sphere with D65 Illumination and 10° observer with specular included on a Datacolor 600™ spectrophotometer to measure L*, a*, b*, C*, h°, and ΔE* color values. Table 3 shows the CIELAB characterizations for the prepared samples.

TABLE 3

|  | Grey 5 | Comp. Purple 1 | Comp. Green 1 |
|---|---|---|---|
| Absolute L* | 78.11 | 67.72 | 80.97 |
| Absolute a* | −0.82 | 9.32 | −3.97 |
| Absolute b* | −3.73 | −16.91 | −0.32 |
| Absolute C* | 3.82 | 19.31 | 3.98 |
| Absolute h° | 258 | 299 | 185 |
| ΔL* | — | −10.39 | 2.86 |
| ΔC* | — | 15.49 | 0.16 |
| Δh° | — | 41 | −73 |
| ΔE* (CIE76) | — | 19.61 | 5.45 | yields a coating that appears black to the human eye. However, when the perylene pigment is utilized in combination with titanium dioxide (as in Comp. Purple 1 and Comp. Green 1 of Example 1) in a single coating, one IR transparent black pigment results in a purple shade, and the other results in a green shade. This is illustrated by comparing Grey 5 with Comp. Purple 1 and Comp. Green 1. Grey 5 is a neutral grey using a blend of the two IR transparent black pigments. For Comp. Purple 1 and Comp. Green 1, that blend was replaced with an equivalent amount by weight of just the individual pigment tints.

Table 3 shows that there is a difference in color between Grey 5 and Comp. Purple 1, with a ΔE of 19.61 and a difference in color between Grey 5 and Comp. Green 1, with a ΔE of 5.45. The L*, a*, and b* values indicate that Grey 5 exhibits an off-white or grey shade, while the L* and h° indicate that Comp. Purple 1 exhibits a purple shade and Comp. Green 1 exhibits a green shade.

Example 4

Several coating compositions from Example 1 were applied over a substrate and coating stack as follows. An untinted white basecoat (commercially available from PPG Aerospace PRC-DeSoto as Desothane® HS CA8000/BAC7067 (Sylmar, Calif.)) was sprayed over an aluminized paper (commercially available as part 20PAP10X15SV from Alufoil Products Co., Inc. (Hauppauge, N.Y.)). The coating compositions were spray applied thereover by hand using a Binks Mach 3 HVLP type spray gun and a 95AS spray cap to a dry film thickness that provided full hiding. Hiding was determined using ASTM D6762 on Leneta black and white hide strips. The cured film coating density for the samples in Table 4 was 1.57 g/cc. The CIELAB color characterizations for these samples, % TSR, and the thickness required for full hiding are shown in Table 4.

TABLE 4

|  | Comp. Pure White 2 | Comp. Grey 1 | Grey 1 | Grey 2 | Grey 3 | Grey 4 |
|---|---|---|---|---|---|---|
| Absolute L* Value | 95.59 | 78.07 | 93.03 | 91.71 | 90.34 | 77.80 |
| Absolute a* Value | −0.72 | −1.88 | −0.87 | −0.87 | −0.84 | −1.88 |
| Absolute b* Value | 1.10 | 0.69 | 0.17 | −0.40 | −0.82 | 0.69 |
| Absolute C* | 1.31 | 2.00 | 0.90 | 0.96 | 1.17 | 2.00 |
| Absolute h° | 123 | 160 | 169 | 205 | 224 | 160 |
| % Total Solar Reflectance | 84 | 44 | 82 | 80 | 79 | 69 |
| Dry Film Thickness of Coating Required to Provide Full Hiding (mils) | 2.65 | 1.45 | 2.45 | 2.05 | 1.53 | 1.45 |
| Weight of Cured Coating at Full Hiding Thickness to Cover Wing (kg) | 38 | 21 | 35 | 29 | 22 | 21 |

The grey color in Grey 5 (from Example 1) was achieved by blending two infrared transparent pigments (perylene pigments) as demonstrated by the measurements included in Table 3. Grey 5 blended a green-shade perylene pigment and a purple-shade perylene pigment.

Each of the individual perylene pigments in Comp. Purple 1 and Comp. Green 1 utilized alone at a high enough concentration and applied at a suitable dry film thickness Given an aircraft wing with a surface area of 360.5 m², typical for a Boeing 787 type aircraft using carbon fiber composite materials, application of the coating composition would result in a range of 21 kg to 38 kg of paint on the aircraft wing for full hiding, as shown in Table 4. In order to maximize the % TSR, it would be necessary to apply a thicker layer and incur a significant weight penalty. Thus, Comp. Pure White 2, while having the best % TSR, would add weight to the component. Meanwhile, Comp. Grey 1 would have the lowest weight, but has a comparatively low % TSR.

Example 5

The samples shown in Table 5 (using coating compositions from Example 1) were prepared as described in Example 2, with a black coating followed by a primer coating and then finally Grey 3 or Comp. Pure White 1. An additional sample was prepared by spraying Comp. Pure White 1 as the highly solar reflective underlayer while Grey 3 was sprayed thereover as a pigmented topcoat, resulting in a two layer coating system. Hiding was determined using ASTM D6762 on Leneta black and white hide strips. Results from these samples are shown in Table 5.

TABLE 5

|  | Grey 3 Single Layer | Comp. Pure White 1 Layer | Grey 3 over Comp. Pure White 1 Two Layers |
|---|---|---|---|
| % TSR | 72 | 80 | 75 |
| Dry Film Thickness of Coating Required to Provide Full Hiding (mils) | 1.8 | 2.8 | 4.0 |
| Cured Film Coating Density (g/cc) | 1.57 | 1.57 | 1.57 |
| Approximate Surface Area of Boeing 787 Wing (m2) | 360.5 | 360.5 | 360.5 |
| Weight of Cured Coating at Full Hiding Thickness to Cover Wing (kg) | 25.9 | 40.3 | 57.5 |
| Weight Savings vs. Two Layers (kg) | 31.6 | — | — |
| % Weight Savings | 55 | — | — |

The % TSR of the two layer system was greater than a single layer of Grey 3. However with the two layer system, the total thickness of the two layers was 4.0 mils compared to 1.8 mils for Grey 3. Therefore, Grey 3 demonstrated a weight savings of 55% over the Gray 3 over Comp. Pure White 1 without a significant loss of % TSR.

The present invention further includes the subject matter of the following clauses.

Clause 1: A solar reflective coating composition comprising: a film-forming resin; a plurality of near-IR transparent pigments dispersed in the film-forming resin, the plurality of near-IR transparent pigments comprising a first perylene pigment and a second perylene pigment different from the first perylene pigment; and a near-IR reflective pigment dispersed in the film-forming resin, the near-IR reflective pigment different from the first perylene pigment and the second perylene pigment, wherein, when formed into a cured coating over a substrate, the cured coating exhibits an off-white or grey color, and wherein the solar reflective coating composition is substantially free of carbon black.

Clause 2: The coating composition of clause 1, wherein the first perylene pigment comprises a green-shade perylene pigment and the second perylene pigment comprises a purple-shade perylene pigment.

Clause 3: The coating composition of clause 1 or 2, wherein the cured coating exhibits the off-white or grey color as defined by the following CIELAB values as measured using an integrating sphere with D65 Illumination, 10° observer with specular component included: a L* value ranging from 40 to 95; an a* value ranging from −2 to 2; and a b* value ranging from −6 to 6.

Clause 4: The coating composition of any of the preceding clauses, wherein the near-IR reflective pigment comprises titanium dioxide.

Clause 5: The coating composition of clause 4, wherein the titanium dioxide is dispersed in the film-forming resin in powder form.

Clause 6: The coating composition of any of the preceding clauses, wherein the cured coating exhibits a total solar reflectance of at least 45% as measured in accordance with ASTM E903-12.

Clause 7: The coating composition of any of the preceding clauses, wherein the cured coating fully hides the substrate at a dry film thickness of less than or equal to 2.5 mils, according to ASTM D6762.

Clause 8: A substrate comprising a surface at least partially coated with the solar reflective coating composition of any of clauses 1-7.

Clause 9: The substrate of clause 8, wherein the substrate is an aerospace component.

Clause 10: The substrate of clause 9, wherein the aerospace component comprises a carbon fiber reinforced polymer composite.

Clause 11: The substrate of any of clauses 8-10, wherein the solar reflective coating composition, when cured, is the sole coating composition on the substrate.

Clause 12: The substrate of any of clauses 8-11, wherein the solar reflective coating composition, when cured, has a dry film thickness of less than or equal to 2.5 mils.

Clause 13: The substrate of any of clauses 8-12, further comprising a basecoat layer underlying at least a portion of the solar reflective coating composition.

Clause 14: The substrate of any of clauses 8-13, wherein the near-IR reflective pigment comprises titanium dioxide.

Clause 15: The substrate of any of clause 14, wherein the titanium dioxide is dispersed in the film-forming resin in powder form.

Clause 16: The substrate of any of clauses 8-15, wherein the first perylene pigment comprises a green-shade perylene pigment and the second perylene pigment comprises a purple-shade perylene pigment.

Clause 17: The substrate of any of clauses 8-16, wherein the solar reflective coating composition, when cured, exhibits the off-white or grey color as defined by the following CIELAB values as measured using an integrating sphere with D65 Illumination, 10° observer with specular component included: a L* value ranging from 40 to 95; an a* value ranging from −2 to 2; and a b* value ranging from −6 to 6.

Clause 18: The substrate of any of clauses 8-17, wherein the solar reflective coating composition, when cured, exhibits a total solar reflectance of at least 45% as measured in accordance with ASTM E903-12.

Clause 19: A method of preparing a low weight aerospace component comprising: coating at least a portion of surface of an aerospace component with the coating composition of clause 1; and curing the solar reflective coating composition to form a solar reflective layer.

Clause 20: The method of clause 19, wherein the solar reflective layer has a dry film thickness of less than or equal to 2.5 mils.

Clause 21: A vehicle comprising a surface at least partially coated with the solar reflective coating composition of nay of clauses 1-7.

Clause 22: The vehicle of clause 21, wherein the vehicle is an aircraft.

Whereas particular embodiments of this invention have been described above for purposes of illustration, it will be evident to those skilled in the art that numerous variations of the details of the present invention may be made without departing from the invention as defined in the appended claims.

The invention claimed is:

1. A solar reflective coating composition comprising:
a film-forming resin;
a plurality of near-IR transparent pigments dispersed in the film-forming resin, the plurality of near-IR transparent pigments comprising a first perylene pigment and a second perylene pigment different from the first perylene pigment; and
a near-IR reflective pigment dispersed in the film-forming resin, the near-IR reflective pigment different from the first perylene pigment and the second perylene pigment,
wherein, when formed into a cured coating over a substrate, the cured coating exhibits an off-white or grey color, and
wherein the solar reflective coating composition is substantially free of carbon black,
wherein the cured coating exhibits the off-white or grey color as defined by the following CIELAB values as measured using an integrating sphere with D65 Illumination, 10° observer with specular component included:
a L* value ranging from 40 to 95;
an a* value ranging from −2 to 2; and
a b* value ranging from −6 to 6.

2. The coating composition of claim 1, wherein the first perylene pigment comprises a green-shade perylene pigment and the second perylene pigment comprises a purple-shade perylene pigment.

3. The coating composition of claim 1, wherein the near-IR reflective pigment comprises titanium dioxide.

4. The coating composition of claim 3, wherein the titanium dioxide is dispersed in the film-forming resin in powder form.

5. The coating composition of claim 1, wherein the cured coating exhibits a total solar reflectance of at least 45% as measured in accordance with ASTM E903-12.

6. The coating composition of claim 1, wherein the cured coating fully hides the substrate at a dry film thickness of less than or equal to 2.5 mils, according to ASTM D6762.

7. A substrate comprising a surface at least partially coated with the solar reflective coating composition of claim 1.

8. The substrate of claim 7, wherein the substrate is an aerospace component.

9. The substrate of claim 8, wherein the aerospace component comprises a carbon fiber reinforced polymer composite.

10. The substrate of claim 7, wherein the solar reflective coating composition, when cured, is the sole coating layer on the substrate.

11. The substrate of claim 7, wherein the solar reflective coating composition, when cured, has a dry film thickness of less than or equal to 2.5 mils.

12. The substrate of claim 7, further comprising a basecoat layer underlying at least a portion of the solar reflective coating composition.

13. The substrate of claim 7, wherein the near-IR reflective pigment comprises titanium dioxide.

14. The substrate of claim 13, wherein the titanium dioxide is dispersed in the film-forming resin in powder form.

15. The substrate of claim 7, wherein the first perylene pigment comprises a green-shade perylene pigment and the second perylene pigment comprises a purple-shade perylene pigment.

16. The substrate of claim 7, wherein the solar reflective coating composition, when cured, exhibits a total solar reflectance of at least 45% as measured in accordance with ASTM E903-12.

17. A method of preparing a low weight aerospace component comprising:
coating at least a portion of surface of an aerospace component with the coating composition of claim 1; and
curing the solar reflective coating composition to form a solar reflective layer.

18. The method of claim 17, wherein the solar reflective layer has a dry film thickness of less than or equal to 2.5 mils.

19. A vehicle comprising a surface at least partially coated with the solar reflective coating composition of claim 1.

20. The vehicle of claim 19, wherein the vehicle is an aircraft.

21. The coating composition of claim 1, wherein the cured coating exhibits a L* value ranging from 55 to 95.

* * * * *